United States Patent
Boccadoro

(10) Patent No.: US 12,377,482 B2
(45) Date of Patent: Aug. 5, 2025

(54) METHOD FOR ELECTRICAL DISCHARGE MACHINING

(71) Applicant: Agie Charmilles SA, Losone (CH)

(72) Inventor: Marco Boccadoro, Verscio (CH)

(73) Assignee: Agie Charmilles SA, Losone (CH)

( * ) Notice: Subject to any disclaimer, the term of this patent is extended or adjusted under 35 U.S.C. 154(b) by 641 days.

(21) Appl. No.: 17/741,942

(22) Filed: May 11, 2022

(65) Prior Publication Data

US 2022/0371115 A1   Nov. 24, 2022

(30) Foreign Application Priority Data

May 18, 2021 (EP) .................................... 21174393

(51) Int. Cl.
*B23H 7/18* (2006.01)
*B23H 7/20* (2006.01)

(52) U.S. Cl.
CPC ............... *B23H 7/18* (2013.01); *B23H 7/20* (2013.01)

(58) Field of Classification Search
CPC .................................... B23H 1/02; B23H 7/18
See application file for complete search history.

(56) References Cited

U.S. PATENT DOCUMENTS

| | | | | |
|---|---|---|---|---|
| 3,558,844 A | * | 1/1971 | Lobur | B23H 1/02 219/69.1 |
| 3,825,715 A | * | 7/1974 | Saito | B23H 1/02 219/69.18 |
| 2018/0221977 A1 | | 8/2018 | Hikosaka et al. | |

FOREIGN PATENT DOCUMENTS

| | | |
|---|---|---|
| DE | 2250872 A1 | 3/1974 |
| EP | 0333170 A1 | 9/1989 |
| JP | 61090822 A | 5/1986 |
| JP | H0295514 A | 4/1990 |

OTHER PUBLICATIONS

Extended European Search Report dated Oct. 21, 2021 for Application No. 21174393.5 (5 pages).
Yu et al, "Improvements in Wire Electrical Discharge . . . ",https://link.springer.com/article/10.1007/s00170-011-3350-2, May 5, 2011, Abstract (The relevancy of this reference is discussed in the background section of this application.).

* cited by examiner

*Primary Examiner* — Geoffrey S Evans
(74) *Attorney, Agent, or Firm* — Harness, Dickey & Pierce, P.L.C.

(57) ABSTRACT

A method for electrical discharge machining (EDM) a workpiece by means of a train of machining pulses. During the machining time the machining pulses are applied to the working gap between workpiece and electrode. An open voltage is first applied, and it is increased to a second open voltage level if a discharge does not occur within a waiting time $d_0$, and further increased to a third open voltage level if a discharge does not occur within a second waiting time $d_1$. The discharge electrical parameters can be adjusted according to the duration of d0 and d1.

10 Claims, 6 Drawing Sheets

METHOD FOR ELECTRICAL DISCHARGE MACHINING

CROSS REFERENCE TO RELATED APPLICATIONS

This application claims the benefit and priority of European Patent Application No. 21 174 393.5 filed May 18, 2021 The entire disclosure of the above application is incorporated herein by reference.

The invention relates to a method for electrical discharge machining (EDM), and particularly to a method and device for generating machining pulses for EDM to enhance the productivity of EDM systems.

BACKGROUND

In EDM a train of machining pulses is applied to the working gap between workpiece and electrode, whereby the workpiece is machined. To monitor the process, the voltage and current profile across the working gap with time is sensed. From the pulse voltage profile of the machining pulse applied to the working gap at the time, characteristic values are derived, such as ignition voltage, ignition delay time, average pulse voltage, etc. In particular, the measured ignition delay time can be used to control the interelectrode distance, or gap width (short: gap), i.e. as disclosed in DE2250872. The measured ignition delay time is compared to a corresponding reference value, and their difference is used to control the axes position and thus the interelectrode gap width. Knowingly, other servo control methods exist, such as the average pulse voltage based gap width control.

The problem in the procedure described above, lies in the comparably slow response time of the machine mechanics with respect to the discharge frequency. In fact, the eigenvalue of a die sinking machine head is less than 70 Hz, so that a quill movement happens in the tenths to hundreds of second range.

Since the discharge frequency of the EDM process can be typically 50 kHz, in other words one discharge every 20 µs, this means that if the quill response time is 10 ms, 500 sparks are likely to discharge at the wrong position.

The machine axes control the gap width by executing small movements, in the attempt to reach the setpoint position. But since they cannot follow the discharge frequency, the performance of the machine is affected in terms of material removal rate, electrode wear, and surface quality. From EP0333170 it is known to adapt the filter frequency of the acquired ignition delay to reduce the machine head instability. This mitigates but does not solve the problem described above.

It is further known from the state of the art to increase the open voltage by which the average ignition delay is reduced. However, these known methods lack in accuracy, because a higher open voltage alone leads to larger gap.

In JP61090822A, e.g., one imposes a time range for the ignition delay of the machining pulses, and if the ignition delay is longer, to raise the open voltage to keep the delay within the two limits. Acting only on the voltage, without the contribution of the gap width control servo, will not solve the problem, since the process would remain in an unfavorable working point and the performance would not be improved.

It is known from JP02095514A to gradually increase the gap voltage when not discharging at a predetermined voltage. The specific addressed application is wire electric discharge machining (WEDM) of materials including insulating particles like diamond, i.e. by WEDM of diamond coated grinding wheels. Its purpose is to avoid wire breakage due to this cause.

Moreover, US2018221977A1 applies voltage spikes to the open voltage or increases the pulse current after a jump movement of the machine head, in order to stabilize the process. In facts, after a jump movement, the gap is very clean and the process oscillates between open voltage pulses and erosion or short circuit pulses. Increasing the voltage of every pulse without considering the ignition delay will only increase the gap width and reduce the machining accuracy, without stabilizing the erosion process.

Increasing the current has the drawback of increasing the surface roughness and the heat affected zone Yu, P. -H., et al, (2011), "Improvement of wire electrical discharge machining efficiency in machining polycrystalline silicon with auxiliary-pulse voltage supply", in The International Journal of Advanced Manufacturing Technology, 57(9-12), 991-1001, https://doi.org/10.1007/s00170-011-3350-2.

This paper describes the application of an initial voltage spike to every pulse to break the insulation of polycrystalline silicon when machining by WEDM. Applying such a voltage spike to every pulse would increase the wire breakage danger when machining with standard regimes, therefore this would require lowering the machining energy and performance for most applications.

SUMMARY OF THE INVENTION

The main aspectof the present invention is to improve the performance and stability of an EDM process by electronic means, since adapting the electrical discharge parameters can be typically 1000 times faster than moving the machine axis. According the invention this is realized without any loss of reproduction accuracy.

The invention achieves this aspect by a method for the electrical discharge machining (EDM) of a workpiece, wherein a plurality of discrete machining pulses are applied to a gap between workpiece and electrode, and wherein an open voltage is applied between the electrode and the workpiece to induce a discharge, and wherein the open voltage of a present pulse is initially applied at an initial open voltage level $U_{o0}$, and said open voltage is then increased to a second open voltage level $U_{o1}$ if a discharge does not occur within a first waiting time $d_0$, and said open voltage is then further increased to a third open voltage level $U_{o2}$ if a discharge does not occur within a second waiting time $d_1$, and wherein an average products sum $W_{step}$ of the partial open voltages $U_{o0}$, $U_{o1}$, $U_{o2}$ times the partial ignition delays $t_{d0}$, $t_{d1}$, $t_{d2}$ is computed based on a plurality of pulses, and wherein said average products sum $W_{step}$ is compared with the average product $W_{tec}$ being the product of a previously set reference open voltage $U_{0\_tec}$ multiplied by the total ignition delay $t_d$, and wherein a servo setpoint value for the gap width control is adjusted such as to reduce the gap width if the average products sum $W_{step}$ is larger than the average product $W_{tec}$, and wherein said servo setpoint value is adjusted such as to increase the gap width if the average products sum $W_{step}$ is smaller than the average product $W_{tec}$.

Another aspect of the present invention is to adapt one or more electrical parameters as a function of the variation of a gap width. To this purpose and according to the invention, the axis position is continuously acquired, and the variation of a gap width is derived from the variation of said axis position. Said electrical parameters may thus be adapted in real time as a function of the variations of the axis position. These electrical parameters include: an initial open voltage $U_{o0}$, a pulse pause $t_o$, a pulse current amplitude I, and pulse current shape $I_{shape}$.

DETAILED DESCRIPTION AND PREFERRED EMBODIMENTS

Preferred embodiments of the invention will now be detailed with reference to the attached drawings, in which FIG. 1 is a plot of a typical machining pulse;

DESCRIPTION OF THE PREFERRED EMBODIMENTS

Figure 1:
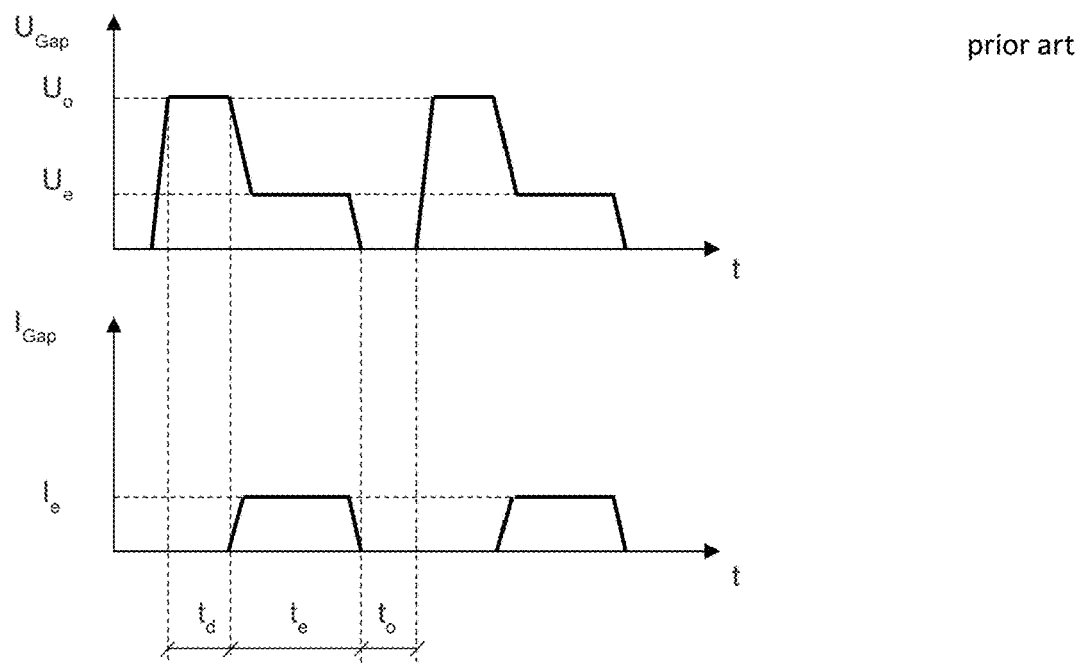
Figure 2:
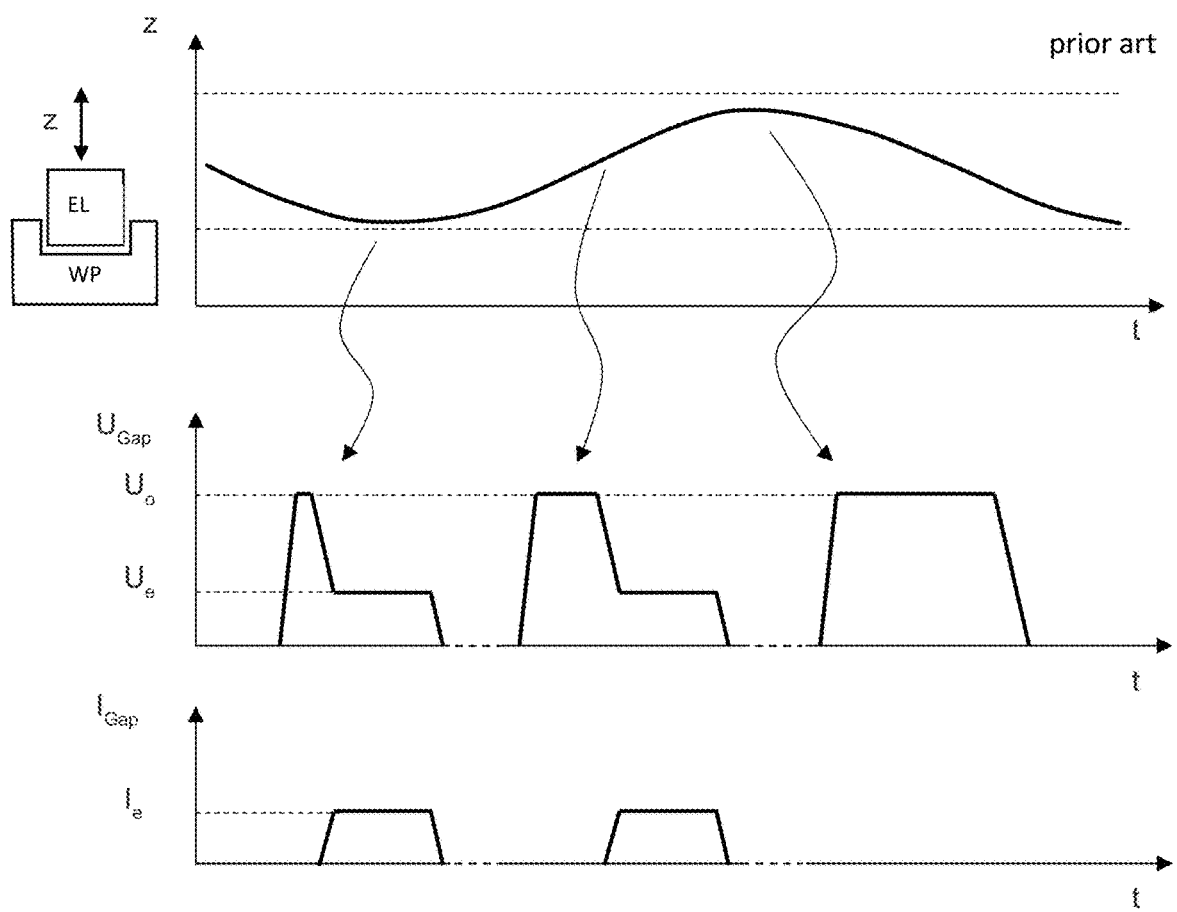
FIG. 2 is a plot of the typical movement of the machine head with associated EDM pulses.

First, referring to FIG. 1 there is illustrated the voltage and current profile of an ideal EDM pulse (or a so-called normal pulse) as a function of time in a known die-sinking electrical discharge machine, with an anodic-poled machining electrode. Such voltage and current profile is, at the start of the pulse, the open voltage $U_o$ is attained and maintained during an ignition delay time $t_d$, after ignition, the open voltage $U_o$ sharply falls to the discharge voltage $U_e$, the machining current $I_e$ flows during the discharge time $t_e$, in the pause time $t_o$ and during ignition delay time $t_d$, no machining current flows and there is no material removal.

The material removal occurs during the discharge time $t_e$, so that ignition delay time $t_d$ and pause time $t_o$ are lost to the machine productivity.

As said, the main object of the present invention is to improve the performance and stability of the EDM process, without any loss of reproduction accuracy.

Thus, in a method for the electrical discharge machining according to a first embodiment of the present invention, a plurality of discrete electrical discharge machining pulses are applied to a gap between workpiece and electrode, wherein an open voltage is applied between the electrode and the workpiece to induce a discharge, wherein the open voltage of a present pulse is initially applied at an initial open voltage level $U_{o0}$, and said open voltage is increased to a second open voltage level $U_{o1}$ if a discharge does not occur within a first waiting time $d_0$, and said open voltage is further increased to a third open voltage level $U_{o2}$ if a discharge does not occur within a second waiting time $d_1$, and an average products sum $W_{step}$ of the partial open voltages $U_{o0}$, $U_{o1}$, $U_{o2}$ times the partial ignition delays $t_{d0}$, $t_{d1}$, $t_{d2}$ is computed based on a plurality of pulses, and said average products sum $W_{step}$ is compared with the average product $W_{tec}$ being the product of a previously set reference open voltage $U_{0\_tec}$ multiplied by the total ignition delay $t_{dT}$, wherein a servo setpoint value for the gap width control is increased if the average products sum $W_{step}$ is larger than the average product $W_{tec}$, and wherein the servo setpoint value is reduced if the average products sum $W_{step}$ is smaller than the average product $W_{tec}$.

The individual steps of the inventive method for electrical discharge machining are now explained in detail.

The method includes applying and progressively increasing an open voltage to induce the discharge, as follows:

an initial open voltage level $U_{o0}$ is first applied to the gap;

If breakdown does not occur within a first waiting time $d_0$, then said initial open voltage level $U_{o0}$ is increased to a second open voltage level $U_{o1}$;

If breakdown does still not occur within a second waiting time $d_1$, then said second open voltage level $U_{o1}$ is increased to a third open voltage level $U_{o2}$.

Figure 3:
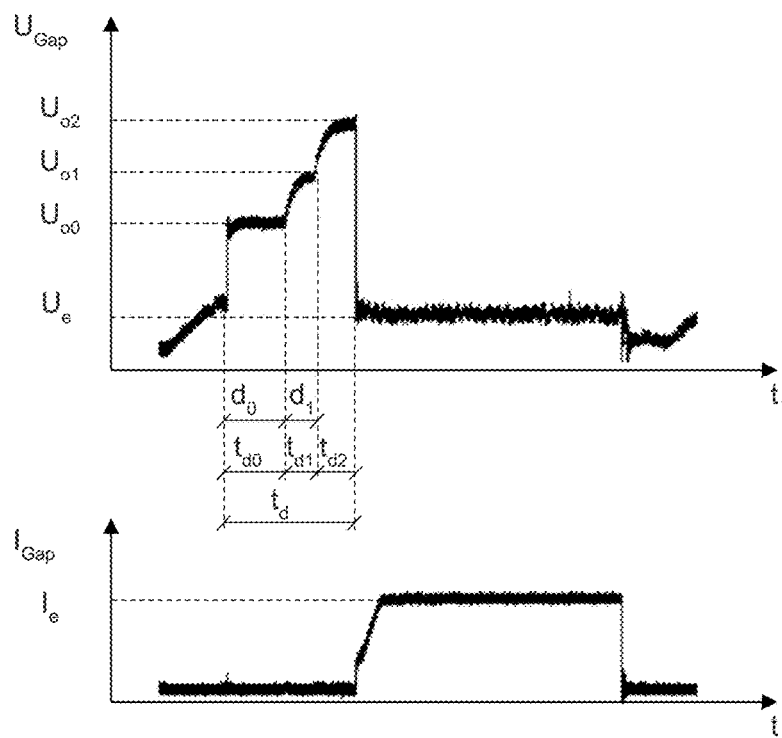
FIG. 3 is an oscilloscope plot of a stepped pulse according the invention as issued from the pulse generator.

In this way the method promotes the breakdown after application of the open voltage, minimizing the unproductive time. FIG. 6a shows the voltage of a typical ideal pulse according the present invention. In comparison, FIG. 6b shows the shape of a typical conventional ideal pulse. Further, FIG. 3 shows an exemplary voltage signal of a pulse according the present invention, as measured by means of an oscilloscope.

Since the duration of the ignition delay time $t_d$ is roughly proportional to the interelectrode gap, raising the open voltage allows to force a discharge to occur. The problem of the comparably slow response of the servo system, which cannot adjust the width of the gap in real-time, is thus relieved by progressively increasing open voltage within the same pulse.

The breakdown may occur at any time after application of an open voltage. The breakdown may occur in the course of the first waiting time $d_0$, or in the course the second waiting time $d_1$ or thereafter. Under circumstances breakdown may not occur at all (open pulse), in which case the open voltage pulse is stopped.

Preferably, the waiting times $d_0$, $d_1$, etc. are predefined values, or predefined percentages of the maximum open voltage application time $t_{dmax}$. For instance, the waiting time $d_0$ is 10% of $t_{dmax}$ and the waiting time $d_1$ is 15% of $t_{dmax}$. The maximum open voltage application time $t_{dmax}$ is for instance 100 μs, means $d_0$ is 10 μs, and $d_1$ is 15 μs.

However, increasing open voltage $U_0$, results in wider machining kerf and poor surface roughness. Simply varying the open voltage would also reduce the reproducibility of machining results. For this reason, a setpoint value for the servo control, i.e. for the control of the interelectrode gap width, is then adjusted.

In case of an average pulse voltage based servo control, the setpoint value for the servo control is a servo reference voltage, whereas in case of an ignition delay time based servo control, the setpoint value is a servo reference delay.

The method according the invention further includes, forming an average products sum $W_{step}$, for instance as follows:

For each pulse, the partial open voltages $U_{oi}$ of a present pulse is multiplied by the respective ignition delay time $t_{di}$;

the partial products $U_{oi}*t_{di}$ of the actual pulse are added up, e.g.:

$$W_{step\_pulse}=(U_{o0}*t_{d0})+(U_{o1}*t_{d1})+(U_{o2}*t_{d2});$$

lastly, the average sum $W_{step}$ of a plurality $n_d$ of pulses is formed by adding the partial products $W_{step\_pulse}$ of said plurality of pulses and dividing by the number of the considered number of pulses $n_d$.

$$w_{step} = \frac{1}{n_d}\sum_{k=1}^{n_d}(w_{step\_pulse})$$

For instance, if the breakdown occurs in the course of the second waiting time $d_1$, the products sum is:

$$W_{step\_pulse}=(U_{o0}*t_{d0})+(U_{o1}*t_{d1})+(U_{o2}*t_{d2})$$

$$t_{d0}=d_0; t_{d2}=0$$

Here, the first product includes the partial ignition delay $t_{d0}$ which corresponds to the entire first waiting time $d_0$. However, the second product includes the partial ignition delay $t_{d1}$ which corresponds only to a part of the second waiting time $d_1$. Moreover, in this example the third product is zero because the breakdown has already occurred, i.e. $t_{d2}$ is zero. For this reason, the partial ignition delays are used to compute the products sum $W_{step\_pulse}$.

Further, the method according the invention includes forming an average product $W_{tec}$, being the average product of a previously set reference open voltage $U_{0\_tec}$ multiplied by the total ignition delay $t_{dT}$, for a considered number of pulses nd, for instance as follows:

For each pulse, the product $W_{tec\_pulse}$ is computed by multiplying the reference open voltage $U_{0\_tec}$ by the respective total ignition delay $t_{dT}$, where the reference open voltage $U_{0\_tec}$ is an open voltage according to a suitable standard machining technology parameter set, and the total ignition delay $t_{dT}$ equates to the sum of the partial ignition delays, $t_{dT}=(t_{d0}+t_{d1}+t_{d2})$;

the average $W_{tec}$ of a plurality of pulses is formed by adding the partial products $W_{tec\_pulse}$ of said plurality of pulses nd, and dividing by the number of the considered pulses nd.

Further, the method according the invention includes comparing the average products sum $W_{step}$ with the average product $W_{tec}$. More specifically, the average products sum $W_{step}$ is subtracted from the average product $W_{tec}$, i.e. $W_{step}-W_{tec}$.

Lastly, the servo setpoint value for the gap width control is adjusted as a function of said value $W_{step}-W_{tec}$ as follows:

the servo setpoint value is adjusted such as to reduce the gap width if the average products sum $W_{step}$ is larger than the average product $W_{tec}$, means the interelectrode gap is reduced;

the servo setpoint value is adjusted such as to increase the gap width if the average products sum $W_{step}$ is smaller than the average product $W_{tec}$, means interelectrode gap is increased.

In substance, the difference of the average products sum $W_{step}$ and the average product $W_{tec}$ is used to adjust the servo setpoint value for the gap width control, and thus lastly adjust the gap between electrode and workpiece.

For instance, a servo compression COMP is used as a servo setpoint value, for the setting of the servo reference delay or the servo reference voltage. The servo compression COMP is a parameter for adjusting the gap width; high COMP value is to set a small gap, whereas low COMP value represents a large gap.

Here, the servo compression COMP is adjusted as a function of the said value of Comp_adj:

the servo compression COMP is increased if the average products sum $W_{step}$ is larger than the average product $W_{tec}$, i.e. Comp_adj is positive;

the servo compression COMP is reduced if the average products sum $W_{step}$ is smaller than the average product $W_{tec}$, i.e. Comp_adj is negative.

In the previous example, the value of Comp_adj was computed by subtracting the average products sum $W_{step}$ from the average product $W_{tec}$, $$Comp\_adj=W_{step}-W_{tec}$$

In an alternative to the previous example, a proportional value Comp_adj_U may be computed as the difference of the average open voltage $U_{0\_step\_avg}$ and the reference open voltage $U_{0\_tec}$:

$$Comp\_adj\_U=U_{0\_step\_avg}-U_{0\_tec}$$

Where $U_{0\_step\_avg}$ is the average open voltage of the number $n_d$ of considered inventive stepped open voltage pulses, which is computed by dividing the average products sum $W_{step}$ by total ignition delay $t_{dT}$, where $t_{dT}$ is the sum of the partial ignition delays $t_{dT}=(t_{d0}+t_{d1}+t_{d2})$ of all considered pulses $n_d$. As mentioned earlier, $U_{0\_tec}$ is the reference open voltage, i.e. an open voltage according to a suitable standard machining technology parameter set, which provides well defined machining results, including defined undercut.

In this variation, Comp_adj_U, i.e. the difference of the average open voltage $U_{0\_step\_avg}$ and the reference open voltage $U_{0\_tec}$ is used to adjust the servo setpoint value for the gap width control. The steps other than the computation of Comp_adj_U remain unchanged.

The servo setpoint value for the gap width control is a servo reference voltage or a servo reference delay or a value derived therefrom.

The reference open voltages $U_{0\_tec}$ are typically determined and provided by the machine tool manufacturer and is stored and made available in a technology database of the control unit. Thus according the invention, the reference open voltage $U_{0\_tec}$ is previously stored in a standard machine database.

According to an embodiment of the invention, an axis position (X, Y, Z, C) is continuously acquired, and a variation of a gap width is derived from the variation of said axis position.

This axis position is the instant axis position of tool and/or workpiece, which is individually acquired for each of the axes (Z, X, Y, C). For instance, an exemplary die-sinking EDM machine bears a workpiece on a stationary table, which rests on a machine base, and the translations of the tool electrode are executed by means of three linear axis slides, which are mounted in series on the base, plus a rotating C-axis placed on the machine head, in series with the Z-axis. For the sake of simplicity, we consider only the Z-axis movement which is executed by the machine head which carries the tool electrode. A variation of the Z-axis position $dZ=Z_i-Z_{i-1}$ corresponds to a same variation of the gap width in the same axis direction.

Figure 7:
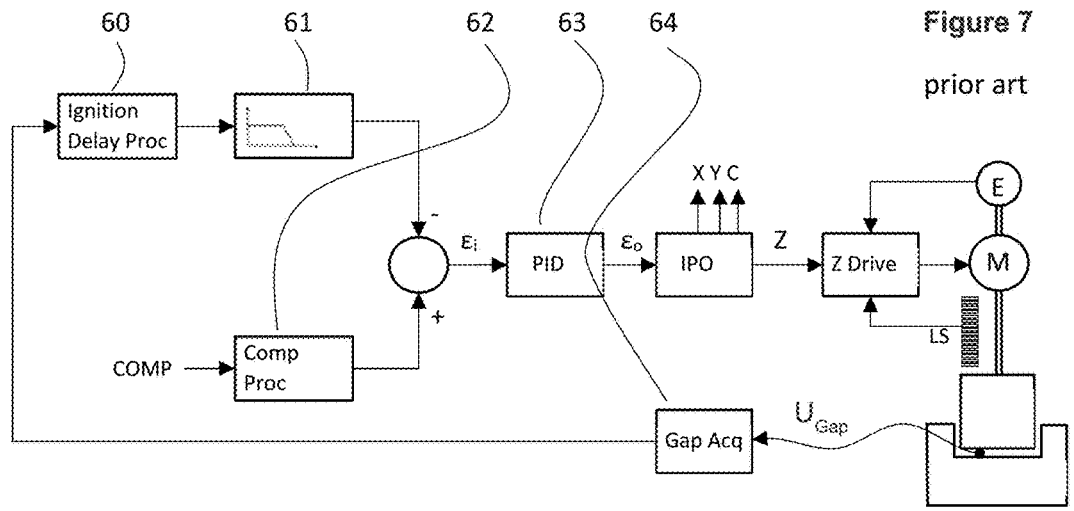
FIG. 7 is a block diagram of a gap control loop according to the state of the art.
Figure 8:
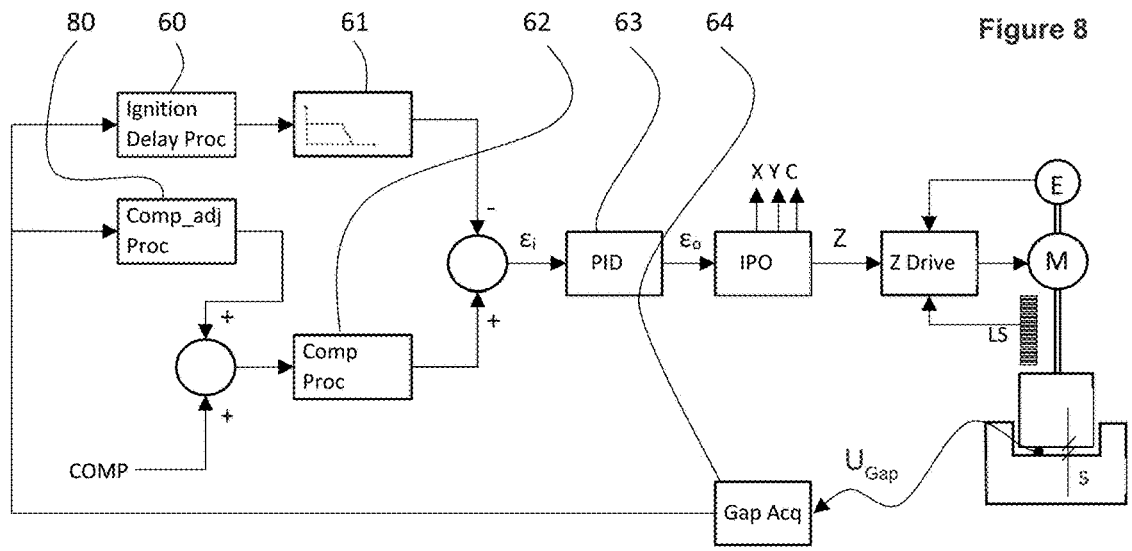
FIG. 8 is a block diagram of the gap control loop according to the invention.
Figure 11:
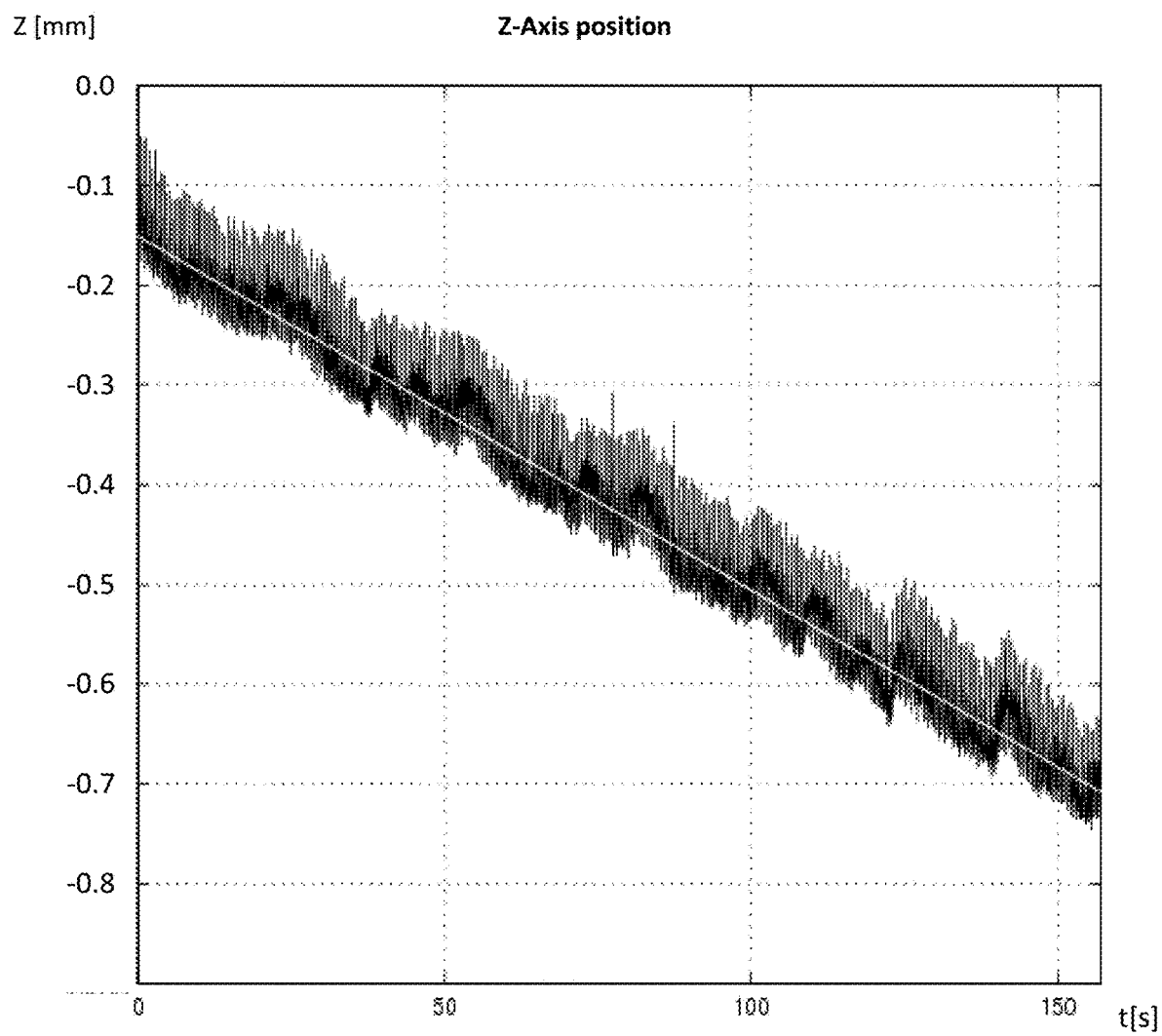
FIG. 11 is a graph illustrating the Z-axis position of a die sinking machine as a function of time when machining a cavity.

The Z-axis position of the machine head is continuously sampled, preferably by means of a glass scale LS or by means of the eroding axes rotary encoders E, as shown in FIG. 7 (prior art) and FIG. 8 (invention). This axis position, e.g. referred to the machine vertical axis position Z, does not show the absolute gap width information, since the cavity bottom is not exactly known, and the cavity bottom is continuously eroded. However, the succession of axis positions delineates the relative oscillation (variation of the axis position) around the instant axis position setpoint value. This is a very useful information, since the machining result variations are correlated to this oscillation, as illustrated by FIG. 11. There one can see how the axis position oscillates around the white line showing the ideal steady feed.

The instant axis position setpoint value is given, e.g. by the actual servo compression value COMP, and the effective axis position is continuously acquired. A relative gap width is derived from the difference of the axis position setpoint value and the acquired axis position. In this way a large, respectively a small gap width is safely determined, and countermeasures can be enacted. Specifically, certain electrical parameters are adjusted in real time as a function of the actual gap width, whereby the process is enhanced.

Figure 4:
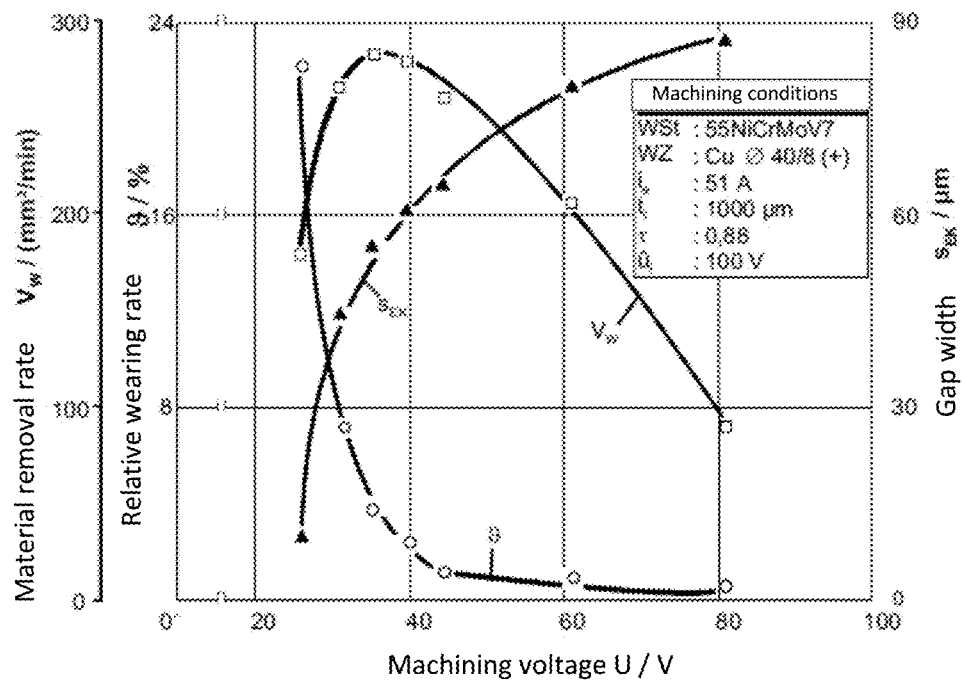
FIG. 4 is a graph illustrating the electrode wear, the material removal rate and the interelectrode gap width as a function of the machining voltage, as known in the art.

FIG. 4 is an illustration excerpt from: W. König, F. Klocke, Fertigungsverfahren Abtragen und Generieren, 4. Auflage, Springer, p. 40, illustration 2.20, 2007, ISBN 3-540-23492-6. As shown, the relative electrode wear υ and the material removal rate $V_W$ are a function of the gap width $S_{EK}$.

Therefore, if the gap width varies and no action is taken, variations of these two results will occur, affecting the machining quality.

In one embodiment, one or more of the following parameters are adapted as a function of the axis position:
  the open voltage $U_o$,
  the pulse pause $t_o$,
  the current pulse amplitude,
  the current pulse shape These actions are aiming to counter the effect of the head oscillation around the optimal working point (Figures not true to scale):
  the open voltage $U_0$, that is at least one of the partial open voltages $U_{o0}$, $U_{o1}$, $U_{o2}$, is adapted as a function of the current machine head position, as follows: $U_0$ is increased if the gap is getting bigger, and decreased if it is getting smaller, as a function of the machine head position (FIG. 5: $U_{o0''}$>$U_{o0'}$);
  the pause times $t_o$ between consecutive machining pulses are adapted as a function of the current machine head position. By reducing the pause time $t_o$ when the gap is big and increasing $t_o$ when the gap is small one can increase the productivity of the process, without increasing the risk of arcing (FIG. 5: $t_{0''}$<$t_{0'}$);
  the current pulse shape $I_{shape}$ and/or current amplitude I are adapted as a function of the machine current head position, as follows: when the gap is small the tendency towards an higher electrode wear is increased, and the wear occurs mainly at the beginning of the discharge, therefore a moderate initial current slope and a slightly reduced current is applied. When the gap is big, a steeper slope and the nominal current is applied (FIG. 5: I'<I'').

By the inventive action the process performance is maintained and enhanced, independently from the machine head oscillations. For this reason, according to an embodiment of the present invention, a controlled oscillation is superimposed to the axis positions. This superimposed micro oscillation consist in a relative movement of the workpiece and electrode at a frequency well above the eigenfrequency of the machine, at an amplitude of 1 to 30 μm, depending on the gap width. The superimposed micro oscillation may be achieved with the machine axes, for instance a machining head moving along the Z-axis, or with an auxiliary device, for instance by means of an electrode holder with piezomotors actuation, etc. In this way a continuous flushing action is provoked in the gap, which promotes the mixing of the dielectric in the gap and the evacuation of the eroded particles, further improving the process performance.

Figure 5:
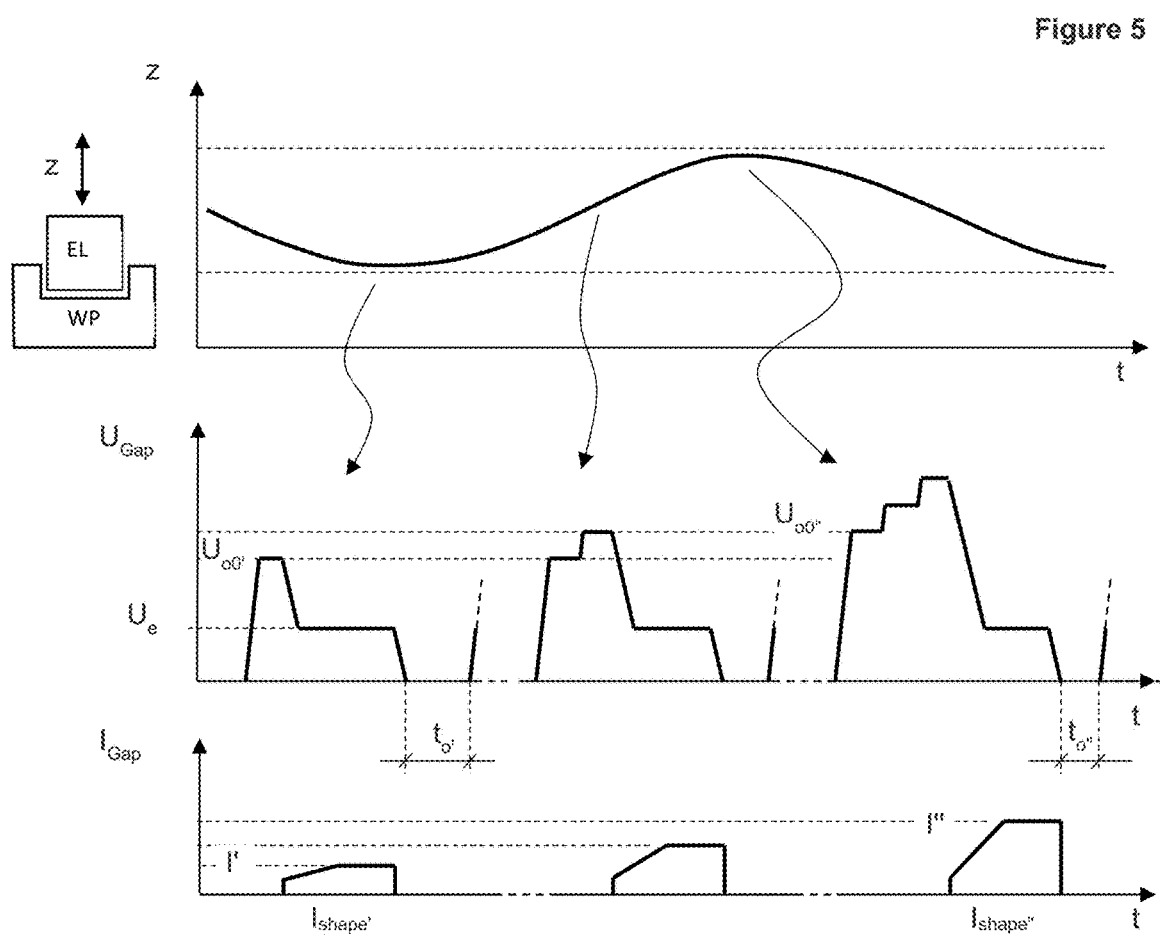
FIG. 5 is a plot of the typical movement of the machine head with associated inventive EDM pulses.

The adaptions to the electrical parameters, such as the initial open voltage $U_0$, pulse pause time between consecutive pulses $t_o$ (FIG. 5: $t_{0''}$<$t_{0'}$), current of normal discharge pulses I (FIG. 5: I'<I''), and shape of the current pulse $I_{shape}$ can be done in real-time, in the course of one control loop, which is typically in the microsecond range.

Accordingly, in another embodiment, one or more of the following parameters is adapted in real-time, as a function of the waiting times $d_0$, and $d_1$:
  the pulse pause $t_o$,
  the pulse current amplitude I,
  the pulse current shape $I_{shape}$.

These parameters can be adjusted with each one or more pulses; the parameter adaptation is thus much faster than what can be done by sampling the axes position.

The following function is built for every pulse or as an average of a plurality of pulses:

$$\text{Gap\_rel}=k_a*t_{d0}+k_b*t_{d1}+k_c*I*T$$

Where Gap_rel is a value proportional to the Gap width, $t_{d0}$ and $t_{d1}$ are ignition delays, $k_a$, $k_b$ and $k_c$ are fitting coefficients, I is the pulse current amplitude, T the pulse lenght, i.e. the applied pulse on-time.

According to the present embodiment, electrical parameters, e.g. pause time $t_o$ between consecutive pulses, current amplitude of pulses I, shape of current pulses $I_{shape}$, are adapted in real-time as a function of Gap_rel, pulse by pulse, as illustrated above (i.e. pause time $t_o$ is decreased if Gap_rel is increased, etc).

Referring now to FIG. 7 there is illustrated a gap control loop diagram according to the state of the art. Here only the Z-axis is shown, for simplicity.

The gap voltage $U_{Gap}$ is measured by means of a Gap acquisition unit 64, then the ignition delay $t_d$ is extracted 60 from said gap voltage signal, in known manner, and then it is filtered 61, according to e.g. EP 0 333 170. This filtered and averaged ignition delay value is subtracted from a value derived from the compression value COMP 62, then it is further processed, e.g. by a proportional integral derivative transfer function PID 63, and its output $\varepsilon_o$ is fed as the new position vector input to the machine interpolator (IPO) that distributes this new position vector to the involved axes.

In this way, the actual value of the ignition delay is controlled according to the servo compression COMP.

The simplified control law is:

$$\text{Delay}[\%]=(k_{offs}-\text{COMP}*k_{comp})*100/k_{offs}$$

e.g., if $k_{offs}$=128 and $k_{comp}$=2.56
  If COMP=0, Delay=100% (open gap)
  If COMP=50, Delay=0% (smallest gap)
  Where Delay[%] is the ignition delay expressed in percent, $k_{offs}$ is an offset coefficient, $k_{comp}$ is an adjusting coefficient, by which the servo compression COMP (servo setpoint value) is set in relation to the ignition delay.

Figure 9:
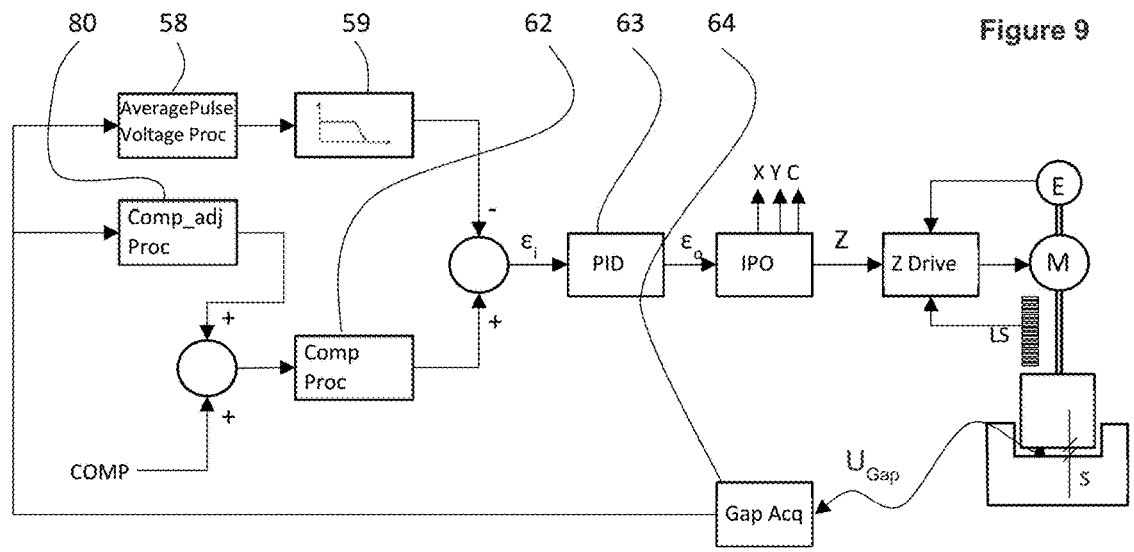
FIG. 9 is a block diagram of the gap control loop according to the invention.

Referring to FIG. 9 there is illustrated an alternative gap width control loop diagram according to the invention. In contrast to the control loop shown in FIG. 8, this control loop uses the extracted average pulse voltage as a feedback signal from the process. The gap voltage $U_{Gap}$ is measured by means of a Gap acquisition unit 64, then the average pulse voltage is extracted 58 from said gap voltage signal, and then it is filtered 59, in known manner. If the average pulse voltage is used to control the gap width instead of the ignition delay, a similar control law is used:

average pulse voltage[%]=average pulse voltage*100/$U_0$ average pulse voltage[%]=($k_{offs}$-COMP*$k_{comp}$)*100/$k_{offs}$ If COMP=0, Voltage_ave %=100% (open gap=$U_0$)

A third gap width control method, very similar to the one illustrated in FIG. 9, utilizes the gap average voltage feedback signal from the process, instead of the average pulse voltage. This method is beneficial when the duty cycle of the pulses (the rate on time vs off time) is small. In these cases, measuring the total gap average voltage (i.e. including also the off time) delivers more information about the gap contamination.

However as mentioned above, in practical applications, increasing the open voltage as shown in FIG. 3 could also increase the undercut, leading to geometric inaccuracy and decreased reproducibility. Thus, one must try to machine using the same average open voltage as in the standard machine database, i.e. the reference open voltage $U_{0\_tec}$ in order to be compatible with the existing application technology and get the same undercut, or even to work by a smaller gap, to increase the copy precision of the EDM process.

According to the present invention, an initial open voltage level $U_{o0}$ is set to be lower than a reference open voltage $U_{0\_tec}$ of a machining according to the standard machine database, which would generate a known undercut. As mentioned earlier, the initial open voltage $U_{o0}$ is then gradually increased to promote the breakdown.
In other words, when replacing a standard machining regime having a reference open voltage $U_{0\_tec}$ of e.g. 100 V by the inventive method, an initial open voltage $U_{o0}$ of e.g. 75 V is chosen. One sees that a compromise between increasing the voltage, and thus the machining speed, and keeping the desired small undercut (side gap) is a priority.

Figure 6:
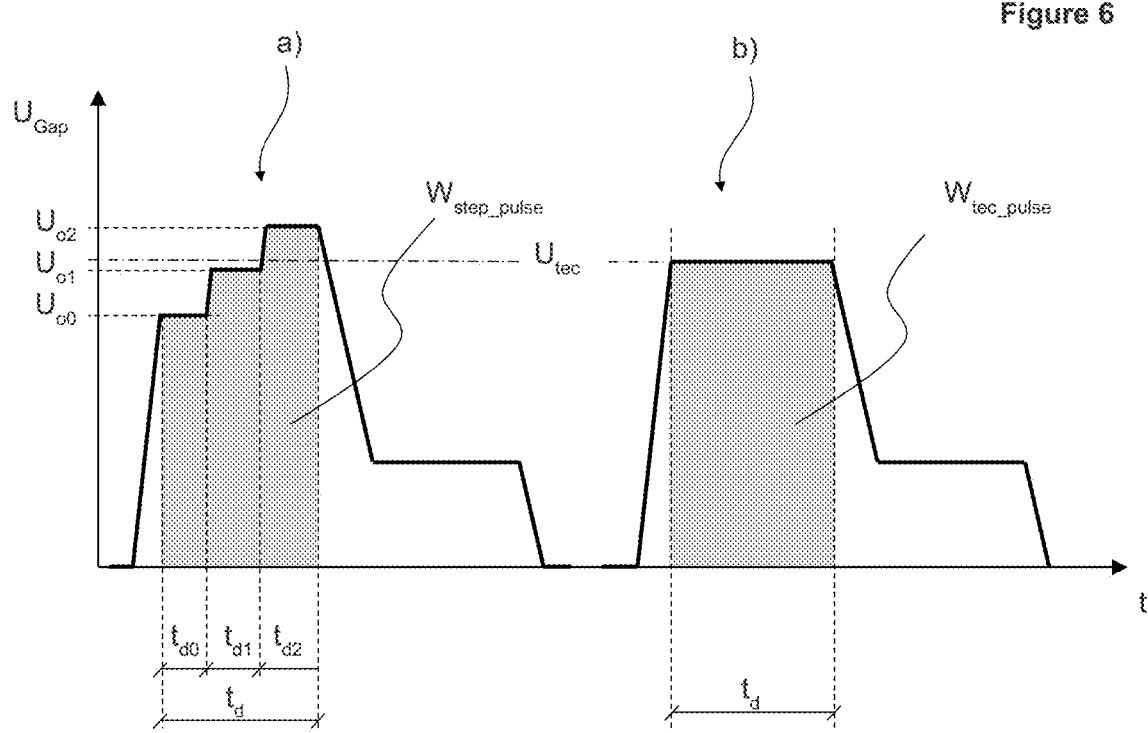
FIG. 6 is a plot of the voltage acquisition from a stepped pulse (a) and from a stadard pulse (b)

Referring now to FIG. 6 and FIG. 8, in a preferred embodiment, for every voltage pulse, a Compression adjustment processor unit 80 builds the products $W_{step}$ of the partial open voltage levels $U_{o0}$, $U_{o1}$, $U_{o2}$ times the partial ignition delays $t_{d0}$, $t_{d1}$, $t_{d2}$:

$W_{step}=t_{d0}*U_{o0}+t_{d1}*U_{o1}+t_{d2}*U_{o2}$

Here $t_{d0}$ and $t_{d1}$ may correspond to pre-defined waiting times $d_0$, and $d_1$. This means, for instance, that if the breakdown occurs after the second waiting time $d_1$, then $t_{d0}=d_0$, and $t_{d1}=d_1$ (see FIG. 3).

Similarly, for every voltage pulse, the Compression adjustment processor unit 80 builds the product $W_{tec}$ of the ignition delay $t_{dT}$ times the open voltage $U_{0\_tec}$:

$W_{tec}=t_{dT}*U_{0\_tec}$

Where $U_{0\_tec}$ is a desired open voltage, e.g. coming from a standard application technology database. The ignition delay $t_{dT}$ is the sum of the partial ignition delays of a pulse, $t_{dT}=t_{d0}+t_{d1}+t_{d2}$.

The values are filtered through a low pass filter, to match the control loop time constant, then Comp_adj is computed:

Comp_adj=$k_1$*($W_{step}-W_{tec}$)

Lastly, Comp_adj is added to COMP, as illustrated in the inventive control loop in FIG. 8.

In this way, if the open voltage is too high, the servo compression is increased and this brings it towards $U_{0\_tec}$. If the open voltage is too low, the servo compression is reduced for the same purpose.

$k_1$ is a factor which is optimized in order to keep the undercut produced by using the inventive pulse identical to the one generated using a reference open voltage $U_{0\_tec}$, according to standard technology.

Moreover, according to an alternative embodiment of the present invention, the undercut can be minimized by reducing the referenced open voltage $U_{0\_tec}$ to a very small value.

The process control acts at the same time in the mechanical frequency range (the gap width control loop), and in the discharge frequency range, which is about 1000 times faster, by applying the actions disclosed above (adaptions of the electrical parameters).

The Comp_adj processing unit 80 adjusts the open voltages, i.e the partial open voltages $U_{o0}$, $U_{o1}$, $U_{o2}$, and/or the waiting times $d_0$, $d_1$ in order to make the average value equal to a reference open voltage $U_{0\_tec}$.

Additionally, in order to optimize the machine performance, another aspect of the inventive method includes to adapt, in real time, the servo setpoint value, i.e. the servo compression COMP by means of the Comp processing unit 62.

These two algorithms can work at the same time: Comp_adj controlling the open voltages, and the adaptation of the setpoint value of servo compression COMP keeping the EDM process at the optimum working point. This optimum working point is the point where the desired machine performance is highest. Due to the stochastic nature of the process, and the micro- and macroscopic geometric conditions of the cavity, this point changes constantly during the machining.

Figure 10:
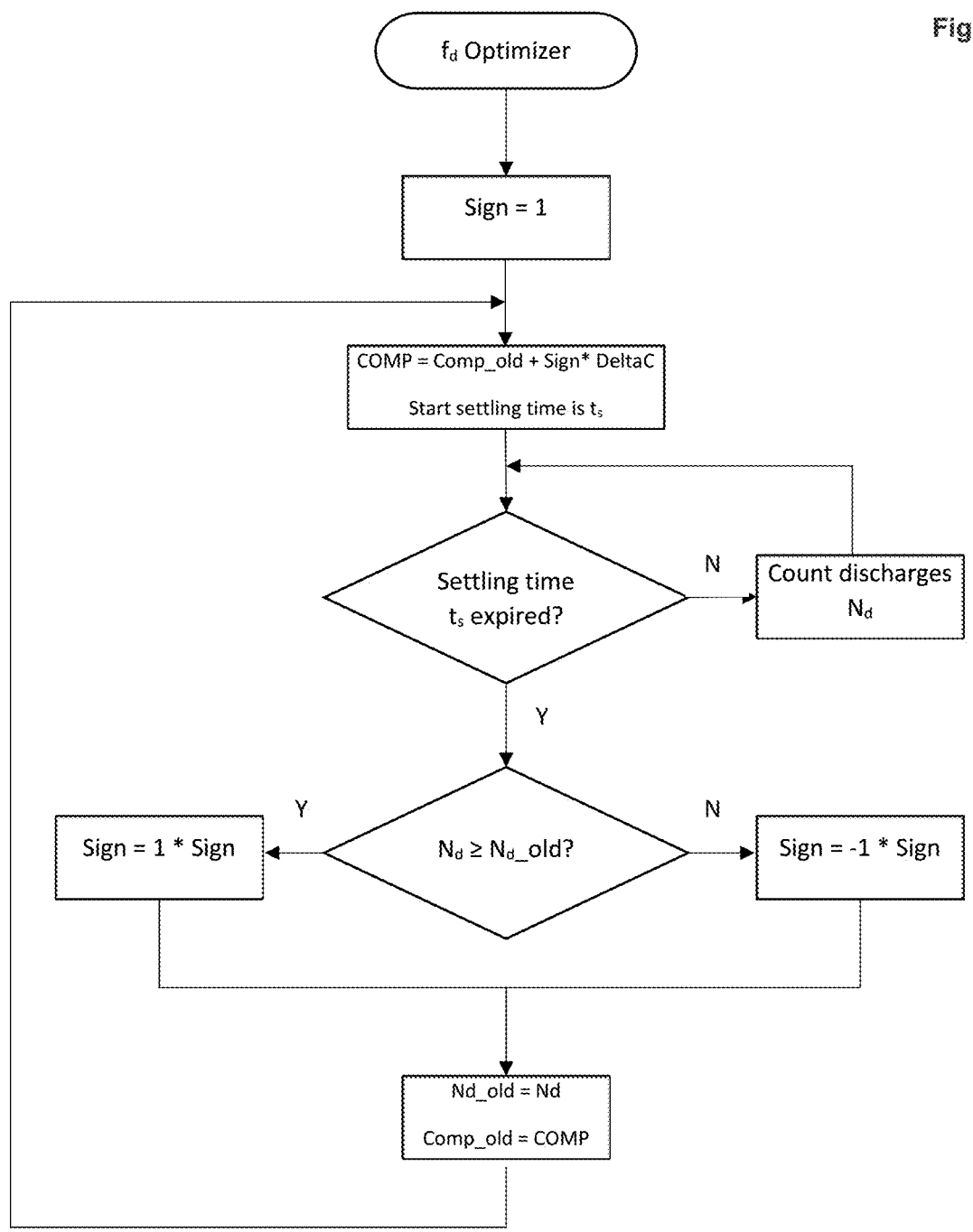
FIG. 10 is a flow chart of an optimal control algorithm.

Here applicable algorithms are those known in the state of the art of the optimal control, like: hill climbing method, simplex algorithm, binary search, reinforcement learning, etc. An exemplary, very simplified embodiment of such an optimization algorithm which aims to maximize the frequency of discharges is illustrated in FIG. 10.
The algorithm assigns a value to setpoint value COMP, waits a settling time $t_s$ for the process to settle, counting e.g. the amount of discharges $N_d$ during this lapse of time, or determining the discharge frequency $f_d=N_d/t_s$.

It will then compare this amount of discharges $N_d$ to a previously acquired one, and, if $N_d$ is higher, change COMP in the same direction, else in the opposite one. Of course, algorithms that are more complex can be applied, as mentioned above.

The amount of discharges $N_d$ can be obtained in this way:
Measuring the current pulses by a current sensor;
Converting the current pulses to a digital information, e.g. by a voltage comparator;
Counting digitally the pulses in a lapse of time using known means (e.g. FPGA, digital counter integrated circuit, microcontroller, etc)

An alternative method to obtain $N_d$ is as disclosed in EP1918054, using signal 32, illustrated in FIG. 6.

Assuming that the generator works in isopulse mode (means the current of every pulse has the same duration $t_e$), it is advisable to use a discharge frequency $f_d$ as a preferred parameter if the material removal rate must be optimized, since, as disclosed by EP1918054, the material removal is proportional to the discharge frequency $f_d$.

Thus, according to an embodiment of the invention, a discharge frequency $f_d$ is acquired, and that the servo setpoint value is adjusted in order to keep the process at the work point where the discharge frequency $f_d$ is maximum.

Assuming that the tool electrode wear rate is known, an alternative might be to use an advance speed $v_{adv}$ of the tool electrode into the workpiece as the parameter to be optimized. The advance speed reflects the removal on both electrodes (i.e. the material removal at workpiece and wearing at the tool electrode), therefore by knowing the wear rate one can deduct the stock removal in the workpiece. The second includes also the tool electrode wear.

Thus, according to a further embodiment of the invention, an advance speed $v_{adv}$ of the electrode into the workpiece is acquired, and that the servo setpoint value is adjusted in order to keep the process at the work point where said advance speed $v_{adv}$ is maximum.

The inventive method has been described exemplarily using a first and a second waiting time $d_0$ and $d_1$, with corresponding increase of the open voltage. The method can be extended to additional waiting times $d_i$ and voltage steps $U_{oi}$, or to a single one, if required by the application. The latter can be beneficial when machining poorly conductive materials. Thus, according to an embodiment, the open voltage is further increased to open voltage levels $U_{oi}$, $U_{o(i+1)}$, . . . if within a further waiting times $d_i$, $d_{(i+1)}$, . . . a discharge does not occur, or it is increased a single time after a single waiting time.

Moreover, instead of voltage steps, a voltage ramp or other forms of progressively rising open voltage can be applied. Here $W_{step\_pulse}$ is computed in consideration of the actual open voltage pulse shape, by again summing up the products of partial open voltages times the partial ignition delay times. The other steps for the adjustment of the servo setpoint value remain unchanged.

The waiting times $d_0$, $d_1$, $d_i$ are preferably predefined values or predefined percentages of the maximum open voltage application time $t_{dmax}$. However the optimization of said waiting times is complex. The same is worth for the partial open voltages $U_{o0}$, $U_{o1}$, $U_{o2}$. Preferably, predefined optimal waiting times are identified using machine learning algorithms such as e.g. Multi-objective black box optimization, with the aim to maximize the discharge frequency $f_d$, for instance. Here, experiments of the same type, with varying machining conditions, including varying waiting times and/or varying partial open voltages $U_{o0}$, $U_{o1}$, $U_{o2}$ are conducted, and discharge frequency or other parameter indicating the material removal rate is determined, and an ML-algorithm is trained by feeding the varying machining conditions, including varying waiting times and/or varying partial open voltages and the resulting discharge frequency, e.g.

REFERENTIALS s gap width
$t_d$ ignition delay time, or ignition delay
$t_{d0}$, $t_{d1}$, $t_{d2}$, $t_{di}$ partial ignition delay times
$t_{dT}$ total ignition delay
$t_{dmax}$ maximum open voltage application time
$t_o$ pulse pause
$d_0$, $d_1$, $d_i$ waiting times
$U_o$ open circuit voltage, open voltage, idle voltage
$U_{o0}$ initial open voltage level
$U_{o1}$ second open voltage level
$U_{o2}$ third open voltage level
$U_{0\_tec}$ reference open voltage
$U_e$ machining voltage, discharge voltage, burning voltage
$I_e$ machining current $W_{step}$ average product of the partial open voltages $U_0$, $U_1$, $U_2$ times the partial ignition delays $t_{d0}$, $t_{d1}$, $t_{d2}$;
$W_{tec}$ product of the set reference open voltage multiplied by the total ignition delay $t_d$
$I_{shape}$ pulse current shape
COMP compression, servo setpoint value
I current amplitude
T applied pulse on-time

What is claimed is:

1. A method for the electrical discharge machining of a workpiece, comprising: wherein a plurality of discrete electrical discharge machining pulses are applied to a gap between work piece and electrode, and wherein an open voltage is applied between the electrode and the work piece to induce a discharge, wherein,
   the open voltage of a present pulse is initially applied at an initial open voltage level $U_{o0}$, and
   said open voltage is increased to a second open voltage level $U_{o1}$ if a discharge does not occur within a first waiting time $d_0$, and
   said open voltage is further increased to a third open voltage level $U_{o2}$ if a discharge does not occur within a second waiting time $d_1$, and
   an average of the products sum $W_{step}$ of the partial open voltages $U_{o0}$, $U_{o1}$, $U_{o2}$ times the partial ignition delays $t_{d0}$, $t_{d1}$, $t_{d2}$ is computed based on a plurality of pulses, and said average products sum $W_{step}$ is compared with the average product $W_{tec}$ being the product of a previously set reference open voltage $U_{0\_tec}$ multiplied by the total ignition delay $t_{dT}$, and
   a servo setpoint value for the gap width control is adjusted such as to reduce the gap width if the average products sum $W_{step}$ is larger than the average product $W_{tec}$, and the servo setpoint value is adjusted such as to increase the gap width if the average products sum $W_{step}$ is smaller than the average product $W_{tec}$.

2. A method for the electrical discharge machining of a workpiece according to claim 1, whrein the servo setpoint value is a servo reference voltage or a servo reference delay or a value derived therefrom.

3. A method for the electrical discharge machining of a workpiece according to claim 1, wherein the reference open voltage $U_{0\_tec}$ is previously stored in a standard machine database.

4. A method for the electrical discharge machining of a workpiece according to claim 1, wherein an axis position (X, Y, Z, C) is continuously acquired, and a variation of a gap width is derived from the variation of said axis position.

5. A method for the electrical discharge machining of a workpiece according to claim 1, wherein one or more of the following parameters are adapted as a function of the axis position:
   the open voltage $U_o$,
   the pulse pause $t_o$,
   the current pulse amplitude I,
   the current pulse shape $I_{shape}$.

6. A method for the electrical discharge machining of a workpiece according to claim 1, wherein a controlled oscillation is superimposed to the axis positions.

7. A method for the electrical discharge machining of a workpiece according to claim 1, wherein one or more of the following parameters is adapted in real-time as a function of the partial ignition delays $t_{d0}$, $t_{d1}$ and $t_{d2}$:
   the pulse pause $t_o$,
   the pulse current amplitude I,
   the pulse current shape $I_{shape}$.

8. A method for the electrical discharge machining of a workpiece according to claim 1, wherein a discharge frequency $f_d$ is acquired, and that the servo setpoint value is adjusted in order to keep the process at the work point where the discharge frequency $f_d$ is maximum.

9. A method for the electrical discharge machining of a workpiece according to claim 1, wherein an advance speed of the electrode into the workpiece is acquired, and that the servo setpoint value is adjusted in order to keep the process at the work point where said advance speed is maximum.

10. A method for the electrical discharge machining of a workpiece according to claim 1, wherein, the open voltage is further increased to an open voltage level $U_{oi}$, $U_{o(i+1)}$, . . . if within a further waiting time $d_i$, $d_{(i+1)}$, . . . a discharge does not occur, or it is increased by a single step after a single waiting time.

\* \* \* \* \*